United States Patent [19]
Ueno et al.

[11] Patent Number: 5,592,628
[45] Date of Patent: Jan. 7, 1997

[54] DATA COMMUNICATION SYSTEM WHICH GUARANTEES AT A TRANSMISSION STATION THE ARRIVAL OF TRANSMITTED DATA TO A RECEIVING STATION AND METHOD THEREOF

[75] Inventors: Haruhiko Ueno; Shigeru Nagasawa; Masayuki Ikeda; Naoki Shinjo; Ken-ichi Ishizaka; Teruo Utsumi; Masami Dewa; Kazushige Kobayakawa, all of Kawasaki, Japan

[73] Assignee: Fujitsu Limited, Kawasaki, Japan

[21] Appl. No.: 595,505

[22] Filed: Feb. 1, 1996

Related U.S. Application Data

[63] Continuation of Ser. No. 109,519, Aug. 20, 1993, abandoned.

[30] Foreign Application Priority Data

Nov. 27, 1992 [JP] Japan ..................................... 4-318212

[51] Int. Cl.$^6$ ................................................ G06F 15/163
[52] U.S. Cl. ................ 395/700.13; 395/183.19; 395/852; 395/873
[58] Field of Search ......................... 395/183.19, 200.13, 395/852, 873, 700

[56] References Cited

U.S. PATENT DOCUMENTS

| 3,824,551 | 7/1974 | Arciprete et al. | 395/875 |
|---|---|---|---|
| 4,502,114 | 2/1985 | Krikor et al. | 395/250 |
| 4,648,030 | 3/1987 | Bomba et al. | 395/425 |
| 4,727,537 | 2/1988 | Nicols | 370/85.2 |
| 5,019,966 | 5/1991 | Saito et al. | 395/775 |
| 5,239,646 | 8/1993 | Kimura | 395/575 |
| 5,363,484 | 11/1994 | Desnoyers et al. | 395/200 |

FOREIGN PATENT DOCUMENTS

| 0472879A2 | 3/1992 | European Pat. Off. |
| WO88/06760 | 9/1988 | WIPO |

Primary Examiner—Ken S. Kim
Attorney, Agent, or Firm—Staas & Halsey

[57] ABSTRACT

Any two of multiple processor elements are coupled with each other via a data communication network that has a definite communication buffer length and includes multiple communication buffers. A packet having a header and body is created using processed data, and then transferred by a transmitting unit. After sending the processed data, the transmitting unit transmits dummy data, having a body which is longer than the communication buffer length in the data communication network, to the same receiving station as the one to which the processed data is transmitted. The transmitting unit then guarantees a processor element serving as a receiving station the arrival of preceding processed data and the header. Control data representing cache invalidation waiting is embedded in the header of the dummy data. When a transmitting end terminates transfer of the dummy data, the sending station can guarantee the termination of cache invalidation, which is performed by the processor element serving as a receiving station to attain the consistency of the contents of preceding storage data main storage and a cache memory.

27 Claims, 11 Drawing Sheets

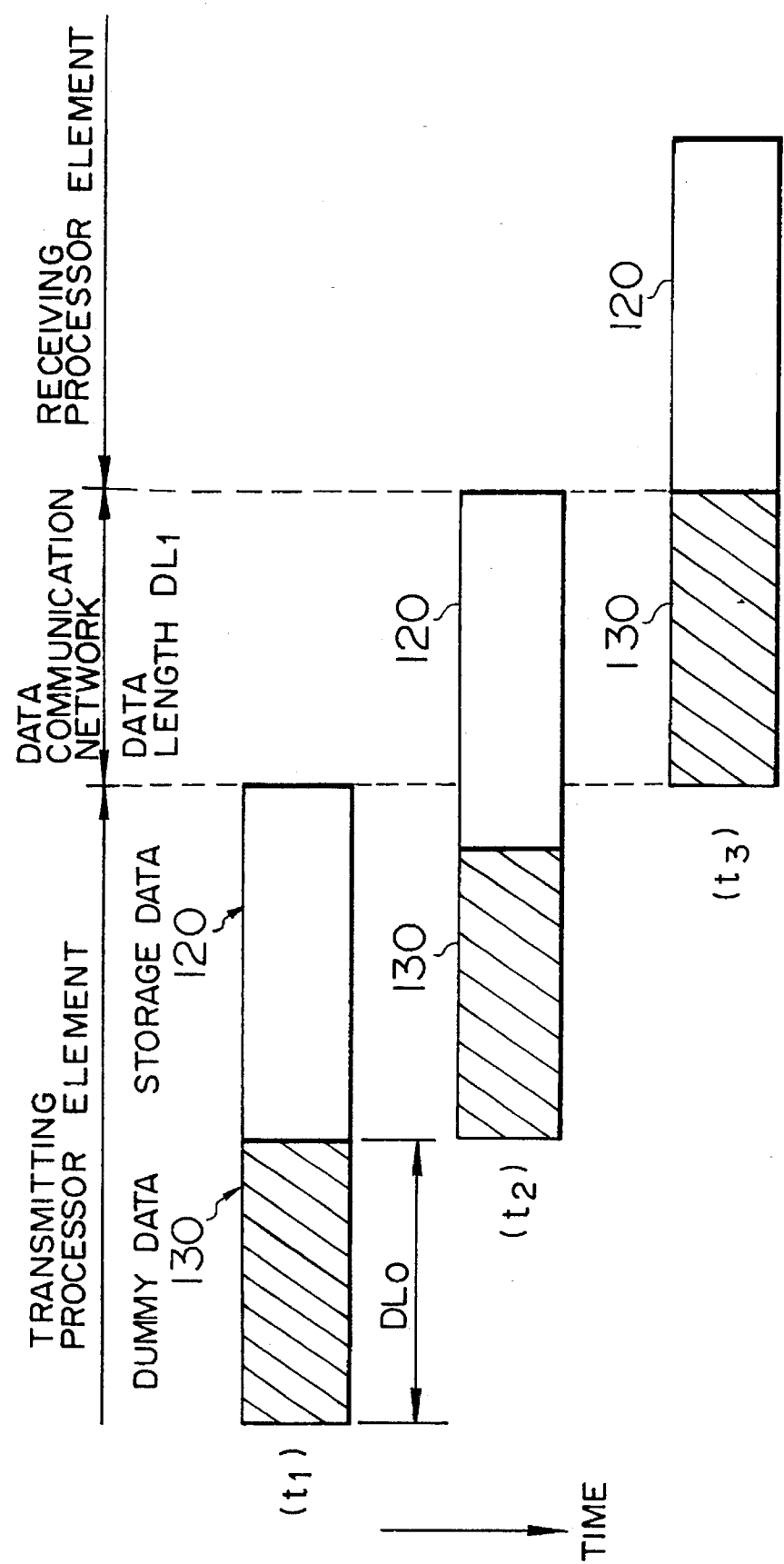

DATA COMMUNICATION SYSTEM WHICH GUARANTEES AT A TRANSMISSION STATION THE ARRIVAL OF TRANSMITTED DATA TO A RECEIVING STATION AND METHOD THEREOF

This application is a continuation of application Ser. No. 08/109,519, filed Aug. 20, 1993, now abandoned.

BACKGROUND OF THE INVENTION

1. Field of the Invention

The present invention relates to a data communication system and method for communicating processed data between processor elements coupled with each other via a data communication network. More particularly, this invention is concerned with a data communication system and method that guarantees the communication of processed data between processor elements constituting a parallel-processing machine.

2. Description of the Related Art

In the field of computers, the adoption of parallel processing aims at a remarkable improvement in throughput. In a computer operating as this kind of parallel-processing machine, a plurality of processing elements are coupled with one another via a data communication network such as a crossbar network including communication buffers. Unprocessed and processed data are transferred between processor elements. At this time, synchronous control is carried out to confirm the termination of data transfer between the processor elements and to proceed to the next parallel processing. The synchronous control makes it necessary to confirm that transfer data has reached a receiving station. It is therefor a must for improvement of the performance of a parallel-processing machine to guarantee the data communication with a simple hardware configuration at a high speed.

In a data communication system for transferring data via a data communication network such as a crossbar network including multiple buffers, the communication buffer length or a maximum communication buffer length for transmitting data from a transmitter to a receiver has been determined on a fixed basis, but the transfer time has not always been fixed. The reason why the transfer time is not determined on a fixed basis is that even when a receiver is coupled with a transmitter via a data communication network, if the receiver is busy, it cannot receive data. When a data communication network is a network made up of crossbar switches, if multiple transmitters send data to the same receiver, data from specific transmitters approach the receiver in the specified order of priorities. At some time instant, data transfer proceeds only for the data from one transmitter according to a defined order of priorities, and the other transmitters are forced to wait for the completion of the data transfer. As mentioned above, when a communication buffer length is fixed but a transfer time is not fixed, it must be guaranteed that data from a transmitter has reached a receiver. In a conventional method for providing this guarantee, the receiver uses a leased line to return a reception end signal to the transmitter or the receiver uses a data communication network to return a reception end signal to the transmitter.

However, in the method that a receiver uses a leased control line to return a reception end signal to a transmitter, additional hardware is required to return a reception end signal. In the method that a receiver uses a data communication network to return a reception end signal. returnable data that represents termination of reception must be created at a receiving end. When hardware is used to create the returnable data, circuits become complex and large in scale. When software is used to create the returnable data, a prolonged period of processing time becomes necessary. In either of the methods, a time lag occurs after a receiver completes data reception until a transmitter is informed of termination of reception. This restricts the performance of a parallel-processing machine having numerous processor elements.

SUMMARY OF THE INVENTION

The present invention provides a data communication system and method such that when the communication data length in a data communication network is fixed but the transfer time is not fixed, it can be guaranteed without a time lag but with only a small number of hardware devices that transfer data from a transmitter has reached a receiver.

To begin with, the present invention is concerned with a parallel-processing machine comprising multiple processing elements (processing units) for executing processing on a parallel basis, a data communication network via which two of the multiple processor elements are coupled with each other with multiple communication buffers between them and which has a definite communication buffer length, and a barrier network for synchronizing parallel processing performed by multiple processor elements. In the parallel-processing machine according to the present invention, each of the multiple processing elements includes a transmitting unit that designates another processing element as a receiving station and transmits processed data, which is stored in a main storage, to the receiving station, a receiving unit that receives transfer data from a transmitting unit in a specific processor element, and a communication guarantee unit for transmitting dummy data, which is longer than the communication buffer length of the data communication network, to the same receiving station immediately after a transmitting unit transmits processed data. A processor element serving as a sending station thus guarantees that processed data has reached a processor element serving as a receiving station.

Each processor element creates and transfers a packet made up of a header and a body. The communication guarantee unit transmits dummy data formed as a packet comprising a header and a body with the data length in the packet made larger than the communication buffer length in the data communication network. A processor element serving as a sending station thus guarantees that preceding processed data has reached a receiving unit in a processor element serving as a receiving station. Since dummy data is transmitted with the data length of the body thereof made larger than the communication buffer length in the data communication network, a processor element serving as a sending station can guarantee how preceding processed data and the header of dummy data act on a receiving unit in a processor element serving as a receiving station. For this purpose, the communication guarantee unit embeds control data, which designates an operation to be performed on the preceding processed data by a processor element serving as a receiving station, in the header of the dummy data, and then transmits the dummy data.

More particularly, the communication guarantee unit sets the data length $LD_0$ of a body in the dummy data to a data length $LD_1+LD_2$; that is, a sum of the communication buffer length $LD_1$ in the data communication network and a transfer data length $LD_2$ corresponding to the time required for the stoppage of data reception, which prevents transmission of a dummy packet from terminating until a processing unit serving as a receiving station interprets control data in the header of dummy data, and executes and terminates a designated operation before receiving the body of dummy data. The transfer data length $LD_2$, for example, corresponds to the processing time required until a processor element serving as a receiving station stops data reception to start a designated operation after interpreting control data in a header. Thereby, a processor element serving as a sending station can guarantee the arrival of processed data at the processor element serving as a receiving station, the arrival of the header of dummy data, and the stoppage of data reception for performing operations designated in control data in the header.

More particularly, each of processor elements, which act as a parallel-processing machine, includes a cache memory that is installed in an instruction processing unit and stores the same processing data as those written in a main storage, and a storage consistency control unit, wherein when processed data is written in the main storage, compares the processed data with an address already registered in the cache memory, and when the data agrees with the address, enqueues the address as an invalidation address for use in invalidating the old data in the cache memory. The storage consistency control unit dequeues such addresses sequentially, and then executes cache invalidation to maintain the consistency between the contents of the main storage and cache memory. Each of the processor elements also includes a cache invalidation waiting unit that stops the data reception for the main storage while the storage consistency control unit is executing cache invalidation, and a control data receiving such that when interpreting the header of received data as a cache invalidation wait instruction, operates the cache invalidation waiting unit to stop data reception and allows the storage consistency control unit to execute cache invalidation.

A communication guarantee unit embeds control data, which represents cache invalidation waiting to a processor element serving as a receiving station, in a header of dummy data, and sets the data length $LD_0$ of a body of the dummy data to a data length $LD_1+LD_2$; that is, a sum of the communication buffer length $LD_1$ in a data communication network and a transfer data length $LD_2$ corresponding to the processing time required until a processor element serving a receiving station interprets the control data in the header and stops data reception for buffer invalidation waiting. Consequently, each transmitting unit can guarantee:

I. the arrival of processed data at a processor element serving as a receiving station;

II. the arrival of the header of dummy data; and

III. the writing into a main storage and the termination of cache invalidation, which are operations designated in the header to be performed on preceding transfer data.

Each processor element includes a transmission end reporting unit that detects the termination of transmission of the dummy data and issues a transmission end report to a barrier network. When receiving transmission end reports from all processor elements that have executed parallel processing, the barrier network extends control, including synchronous control, in which control is passed to the next step of parallel processing.

Each of the processor elements, which together act as a parallel-processing machine, includes a main storage, a main control unit, a scalar unit including a central processing unit for executing scalar computation and a cache memory, a vector unit for executing vector computation, a data transmission unit (data transmission processor) for transferring data to or from a data communication network, a synchronous processing unit (barrier processing unit) for extending synchronous control via a barrier network, and an input/output unit for inputting or outputting data from or to external equipment. If necessary, a processor element may not include the vector unit and/or input/output unit. The data communication network for coupling multiple processing elements on a one-to-one basis is a crossbar network including buffer memories.

According to the foregoing data communication system of the present invention, when a transmitting end detects the termination of transmission of dummy data which is longer than the communication data length in the data communication network, it can be guaranteed that all the data transmitted previously have arrived at a receiving station. Particularly, a packet comprising a header containing various kinds of control information for the receiving station and a body containing processed data itself is created and then transferred as transfer data for one communication session. The data length in the body of the dummy data is larger than the communication buffer length, whereby when a transmitting end terminates transmission of dummy data, it can be guaranteed that the preceding storage data and the header of the dummy data have arrived at a receiving station. When control data representing a specified operation to be performed by a receiving unit in a receiving station is embedded in the header of the dummy data, the data length in the body of the dummy data formed as a packet is a sum of:

Communication buffer length+Transfer data length corresponding to the time required until the control data in the header of dummy data is interpreted and a designated operation is started.

With the termination of transmission of dummy data at a transmitting end, a receiving end can therefore guarantee the termination of all operations needed for preceding transfer data and pass control to the next processing.

In the aforesaid data communication system according to the present invention, store access to a main storage for data transferred to the receiving station and cache invalidation for a cache memory are carried out to maintain the consistency between the contents of the main storage and cache memory, so that a sending station can guarantee the processing of a receiving station. To be more specific, a processor element that has received transfer data performs store access to write the transfer data in a main storage, and executes cache invalidation to invalidate old data existent in the cache memory. The cache invalidation is referred to as buffer invalidation (BI). The buffer invalidation is executed by a storage consistency control circuit in a main control unit (MCU) incorporated in a processor element. The storage consistency control circuit includes a memory, which is referred to as a second tag field TAG2, for storing registered addresses of the cache memory. A storage address is compared with a cache address contained in the second tag field TAG2. When the addresses agree with each other, a cache invalidation address (BI address) is generated. In contrast, a cache memory installed in a central processing unit comprises a first tag field TAG1, in which registered cache addresses are stored, and a data division. A registration address in the first tag field TAG1, which corresponds to the cache invalidation address generated by the main control unit, is invalidated. After the main storage is rewritten, access to old data in the cache memory is inhibited. As a result, the contents of the main storage and cache memory become consistent with each other.

Invalidation of the first tag field TAG1 according to cache invalidation addresses generated by the main control unit is not executed immediately but temporally placed in a stack memory which is referred to as a BI queue (BI addressing queue). Before the BI queue becomes full, data reception as part of store access is stopped, and cache invalidation addresses are fetched sequentially from the BI queue. Invalidation of the first tag TAG1 is then executed. This kind of control for matching the contents of the main storage and cache memory is also performed when storage data is received from another processor element.

The data communication system according to the present invention can guarantee that when a transmitting end terminates transmission of dummy data, a processor element serving as a receiving end terminates the cache invalidation for storage consistency control. For this guarantee, control data representing cache invalidation waiting to the transmitting end is embedded in the head of dummy data, and then the dummy data is transferred. The control data in the header, which represents cache invalidation waiting, is interpreted by a control data receiving unit. A cache invalidation waiting unit is then activated. The cache invalidation waiting unit stops reception of storage data in order to execute cache invalidation, waits for buffer invalidation to terminate, and then restarts data reception.

With the operation of cache invalidation waiting performed by a receiving station, the time required until data reception is started is guaranteed by stopping data reception until a receiving unit terminates cache invalidation. When transmission of dummy data terminates, the receiving station executes buffer invalidation waiting to temporarily stop data transfer. All cache invalidation addresses indicating previous storage data are then read from a BI queue sequentially. Cache invalidation is then executed to invalidate the addresses in the first tag field TAG1. The BI queue is thus emptied. Cache invalidation terminates (the consistency between the contents of the main storage and cache memory is attained). Cache invalidation waiting is then released to restart data reception.

Data may be distributed to numerous processor elements and subjected to parallel processing. In this case, when a transmitting end confirms that transfer of dummy data has terminated immediately after transfer of processed data, it can be guaranteed that a receiving station has terminated the store access for a main storage and cache invalidation. Using the termination of the transmission of dummy data by all processor elements as synchronous information, control can be passed to the parallel processing at the next step at a high speed.

The above and other objects, features, and advantages of the present invention will be more apparent from the detailed description below with reference to the drawings.

BRIEF DESCRIPTION OF THE DRAWINGS

FIG. 11 is a timing chart showing fundamental data communication using dummy data according to the present invention.

DETAILED DESCRIPTION OF THE PREFERRED EMBODIMENT

Figure 1:
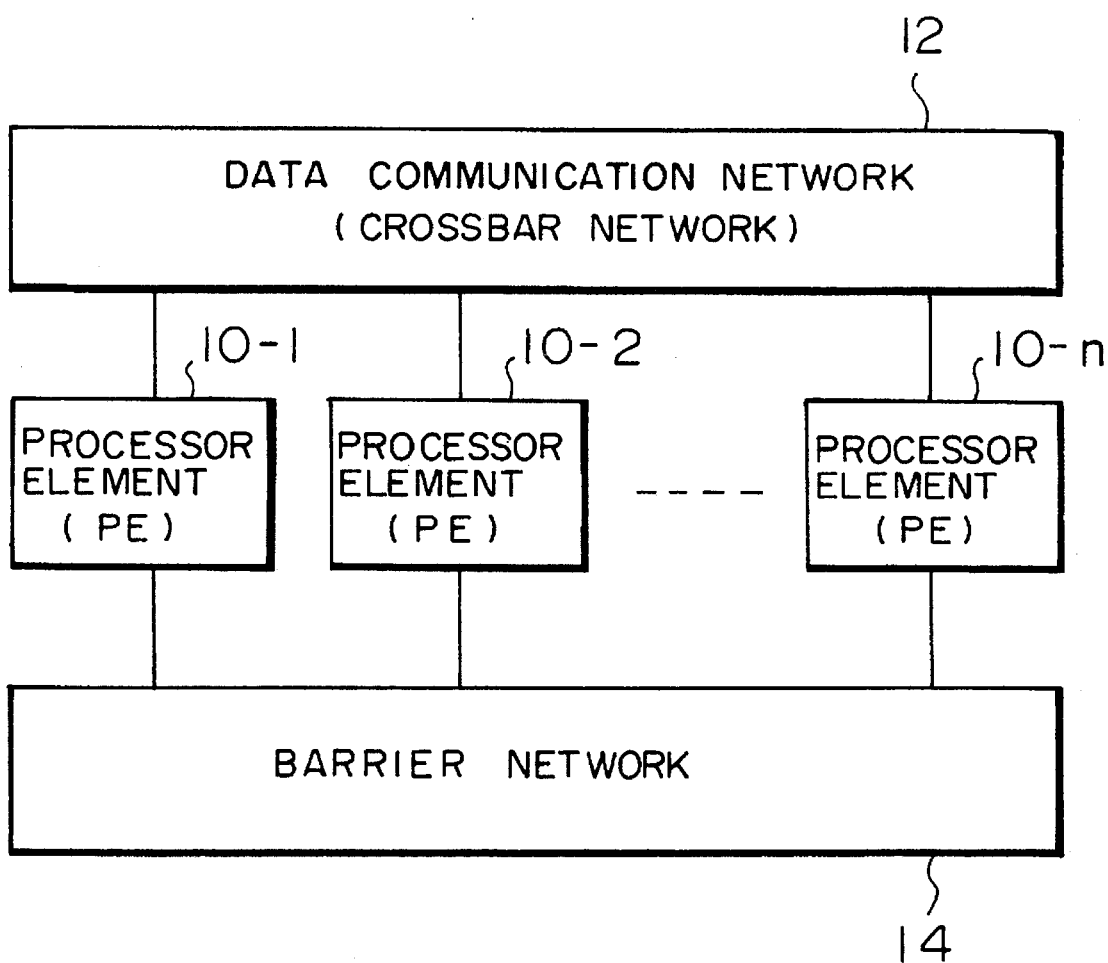
FIG. 1 is a block diagram of a parallel-processing machine in which a data communication system of the present invention is implemented.

FIG. 1 schematically shows a parallel-processing machine in which a data communication system of the present invention is implemented. In this parallel-processing machine, n units of processor elements 10-1, 10-2, etc., and 10-n are connected with one another via a data communication network 12 such as a crossbar network consisting of multiple communication buffers, so that they can be coupled with one another on a one-to-one basis. The parallel-processing machine further includes a barrier network 14 for synchronizing parallel processing performed by the processor elements 10-1 to 10-n. Up to n=222 units of processor elements can be included as the processor elements 10-1 to 10-n. For example, when the throughput of one processor element is 1.6 giga FLOPS, the processor elements 10-1 to 10-n provide a peak throughput of 355.2 giga FLOPS as a whole.

Figure 2:
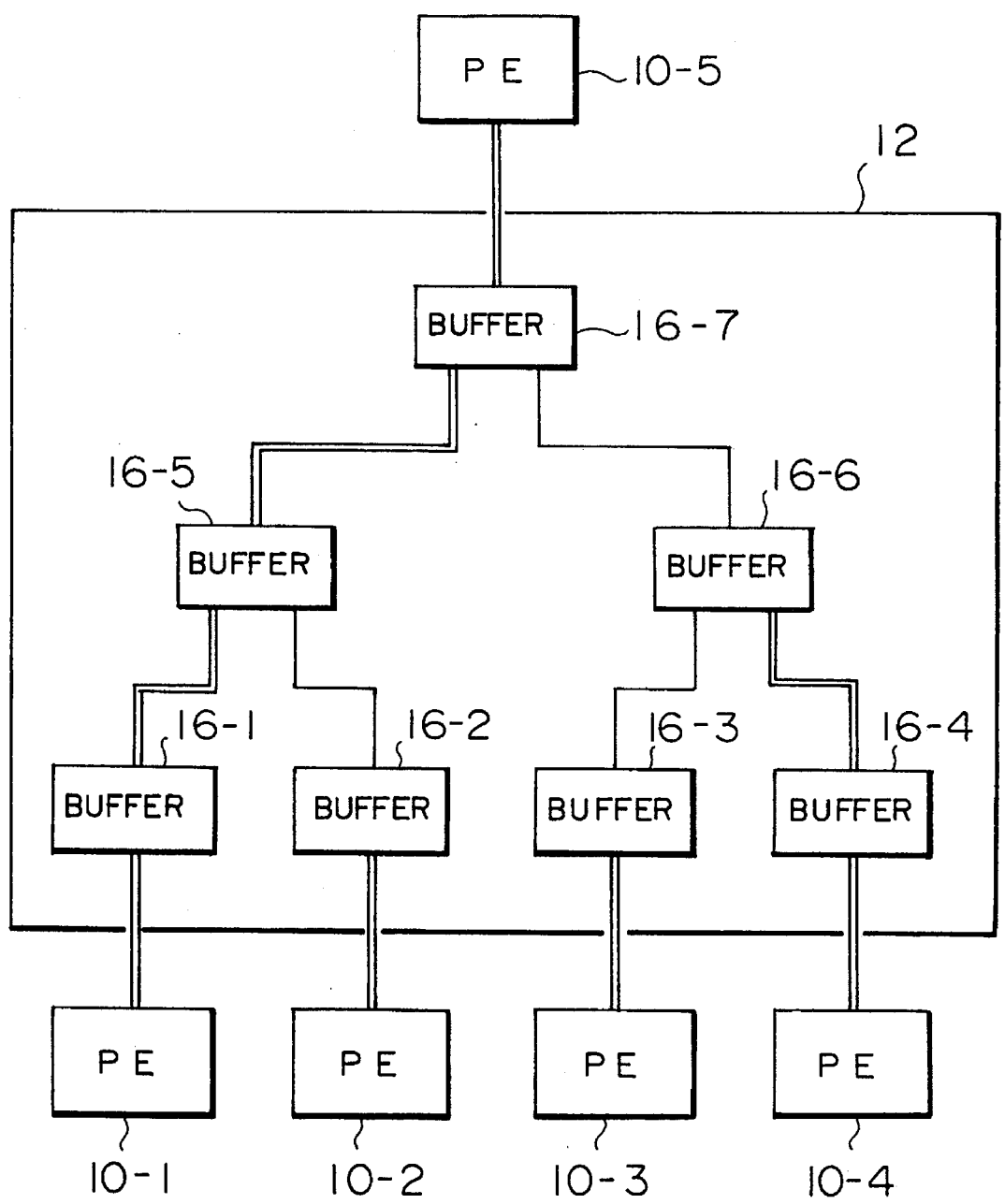
FIG. 2 is a schematic explanatory diagram of the data communication network in FIG. 1.

In FIG. 2, the schematic configuration of the data communication network 12 in FIG. 1 is shown on the assumption that five units of processor elements 10-1 to 10-5 are installed. In FIG. 2, data communication is carried out from four processor elements 10-1 to 10-4 to one processor element 10-5. The data communication network 12 has a hierarchical structure in which the processor element 10-5 serving as a shaped receiving station ranks as a higher order than the four processor elements 10-1 to 10-4 serving as sending stations. In the hierarchical structure using transfer buffers 16-1 to 16-7 of this embodiment shown in FIG. 2, a communication path has is established between the processor elements 10-1 and 10-5. Data transfer requested by the other processor elements 10-2 to 10-4 is placed in the wait state intermediately. Specifically, the processor element 10-1 has accessed the buffers 16-1, 16-5, and 16-7 to establish a communication path leading to the processor element 10-5, and is carrying out data transfer. In contrast, the processor element 10-2 succeeds in accessing the buffer 16-2 but fails in accessing the buffer 16-5 because of priority control. After transferring data to the buffer 16-2, the processor element 10-2 is placed in the wait state. The processor element 10-3 succeeds in accessing the transfer buffer 16-3 but fails in accessing the transfer buffer 16-6 because of the priority control by the processor element 10-4. The processor element 10-3 has stopped data transfer after transferring data up to the transfer buffer 16-3. The processor element 10-4 succeeds in accessing the transfer buffer 16-6 but fails in accessing the transfer buffer 16-7 in the last stage because the transfer buffer 16-7 has already been accessed by the processor element 10-1. The processor element 10-4 is thus placed in the wait state.

In data communication between processor elements via the data communication network, which consists of transfer buffers, shown in FIG. 2, the communication data length in the data communication network is determined on a fixed basis depending on the number of transfer buffers employed. However, the transfer time is not determined on a fixed basis because of the latency resulting from priority control of buffers.

Figure 3:
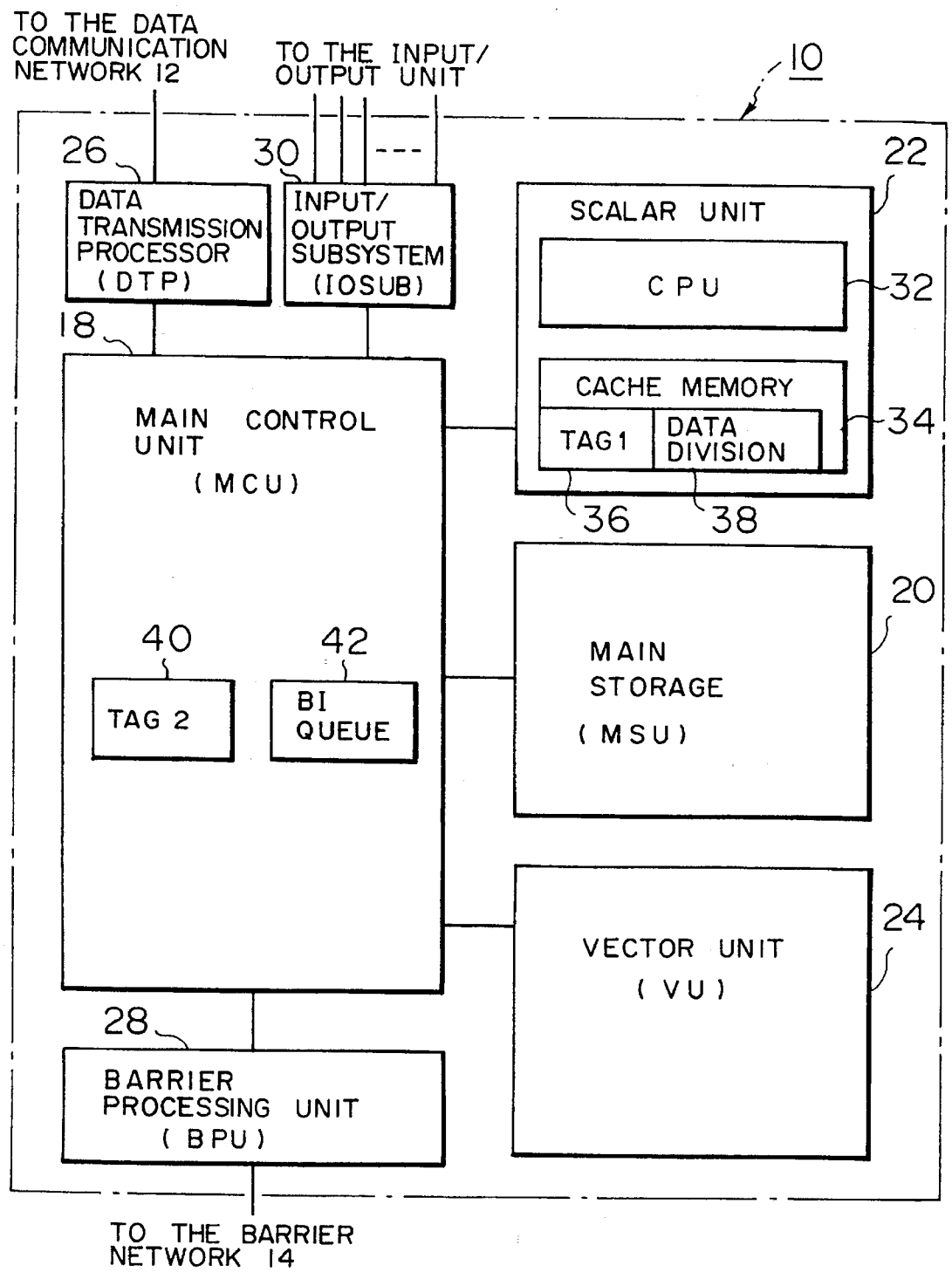
FIG. 3 is a block diagram showing an embodiment of a processor element in FIG. 1.

FIG. 3 shows an internal configuration of each of the processor elements 10-1 to 10-n shown in FIG. 1. A processor element 10 comprises a main control unit (MCU) 18, a main storage (MSU) 20, a scalar unit 22, a vector unit 24, a data transmission processor 26 for transferring data via a data communication network 12, a barrier processing unit 28 for extending synchronous control to a barrier network 14, and an input/output subsystem 30 for extending input/output control to external storages. The scalar unit 22 includes a CPU 32 and a cache memory 34. The cache memory 34 consists of a data division 38 in which the same data as those existent in the main storage 20 are stored, and a first tag field. TAG1 36 in which storage addresses of data stored in the data division 38 are contained. The main control unit 18 includes a second tag field TAG2 40 and a buffer invalidation queue (BI queue) in which buffer invalidation addresses are enqueued. The second tag field 40 in the main control unit 18 contains addresses including the addresses existent in the first tag field 36 in the cache memory 34 installed in the scalar unit 22. For example, the first tag field 36 contains addresses for, for example, four blocks on the assumption that one block consists of sixteen bytes. In contrast, the second tag field 40 contains block addresses as cache addresses on the assumption that one block consists of 256 bytes or a four-fold value of the number of bytes in one block in the first tag field 36.

When a processing unit except the CPU 32 performs store access on the main storage 20, the main control unit 18 references the second tag field 40 for a storage address. If a consistent address is present, the address is put as a buffer invalidation address (BI address) in the buffer invalidation queue 42. Invalidation addresses enqueued in the buffer invalidation queue 42 are sent to the CPU 32 according to the specified timing that the queue becomes full. If consistent addresses are present in the first tag field 36 in the cache memory 34, the consistent addresses are invalidated. When buffer invalidation is executed for the cache memory 34 by dequeuing buffer invalidation addresses from the buffer invalidation queue 42, the reception of storage data for the main control unit 18 is placed in the stopped state.

If the main storage 20 is a shared memory that is also used by a scalar unit installed in another main control unit, serialization is performed concurrently with buffer invalidation for the cache memory 34. During the serialization, the buffer invalidation addresses fetched from the buffer invalidation queue 42 are transferred to a buffer invalidation queue installed in another main control unit. Buffer invalidation is performed on a cache memory associated with a CPU that is connected to the above other main control unit. The contents of the main storage 20 and cache memory 34 thus become consistent with each other.

Figure 4:
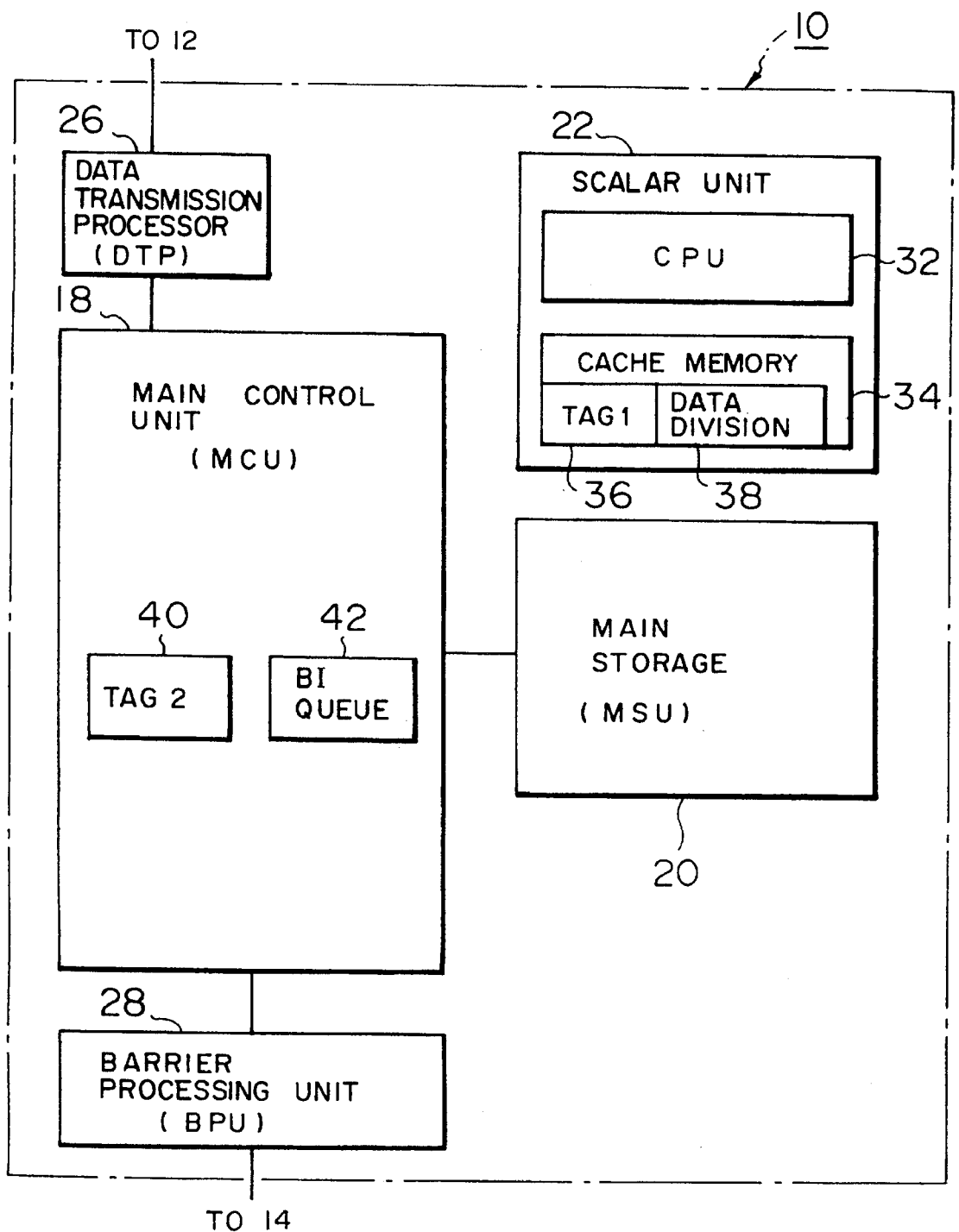
FIG. 4 is a block diagram showing another embodiment of a processor element in FIG. 1.

FIG. 4 shows another embodiment of a processor element shown in FIG. 1. This embodiment does not include the vector unit 24 and input/output subsystem 30 shown in FIG. 3. The processor element 10 having the configuration shown in FIG. 4 may be employed as one of processor elements constituting a parallel-processing machine. Even in the processor element 10 in FIG. 4, the cache memory 34 in the scalar unit 22 consists of the first tag field (TAG1) 36 and data division 38. The main control unit 18 includes the second tag field (TAG2) 40 and buffer invalidation queue (BI queue) 42.

Figure 5:
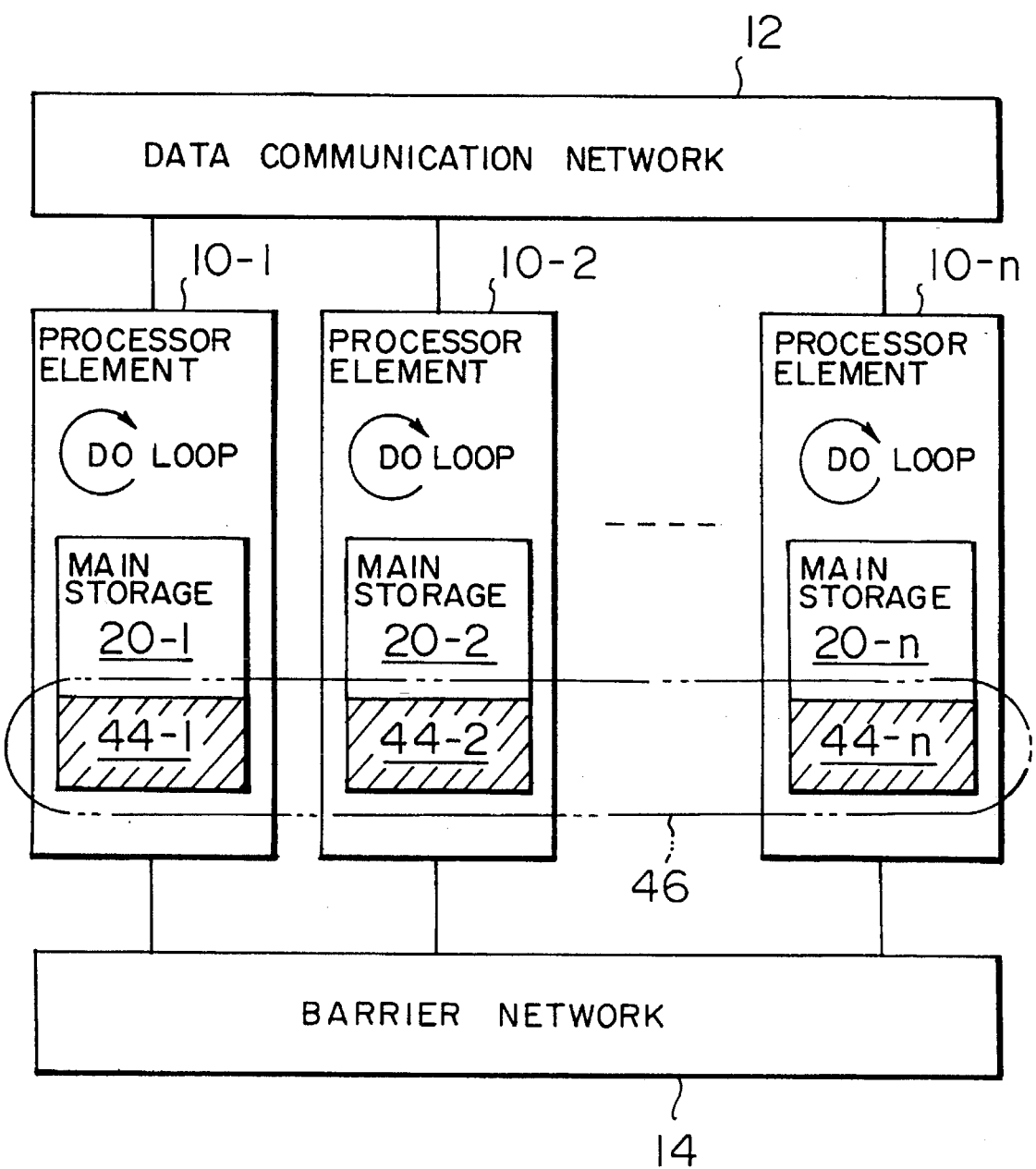
FIG. 5 is an explanatory diagram showing a global memory in the parallel-processing element in FIG. 1 and parallel processing.

FIG. 5 shows a configuration of a memory consisting of main storages 20-1 to 20-n installed in processor elements 10-1 to 10-n that constitute a parallel-processing machine in FIG. 1. The main storages 20-1 to 20-n installed in the processor elements 10-1 to 10-n are used as local main storages in the respective processor elements. Portions of the main storages 20-1 to 20-n, which are hatched in FIG. 5, are assigned as shared memory areas 44-1 to 44-n. The shared memory areas 44-1 to 44-n are managed using logical addresses that are defined in units of multiple physical addresses of shared memory areas, thus forming a global memory 46 to be shared by all the processor elements 10-1 to 10-n. The global memory 46 consists of the multiple processor elements 10-1 to 10-n. Thanks to this configuration, after data read from the global memory 46 are distributed to the processor elements 10-1 to 10-n and parallel processing is executed, the results of the processing are stored at a specific physical address in the global memory 46. During parallel processing using the global memory 46, data transfer is performed between processors via the data communication network.

Assuming that five processor elements execute a DO loop of DO (0, 100) as parallel processing, the parallel processing of the DO loop nested to I=20 levels is allocated to each of the five processor elements. Data needed for the DO loop at a level is read from the shared memory area in a specific processor element, and allocated to the processor element concerned via the data communication network 12. The five processor elements thus execute the DO loop by processing 20 nested DO loops on a parallel basis. When each processor element finishes with the allocated DO loops, used data are transferred to and written in the shared memory areas in the specific processor elements in which the data used to reside. The barrier network 14 checks termination of writing. Control is then passed to the parallel processing of a subsequent DO loop. As mentioned above, parallel processing is executed by distributing data from specific areas in the global memory 46 to the multiple processor elements 10-1 to 10-n. This kind of parallel processing requires such data communication that processed data are transferred to and written in the areas in the global memory 46 in which the data used to reside, and, at the same time, the completion of the storage consistency control, which attains the consistency between the contents of the global memory 46 and each of cache memories by performing invalidation on the cache memories, is guaranteed.

Figure 6:
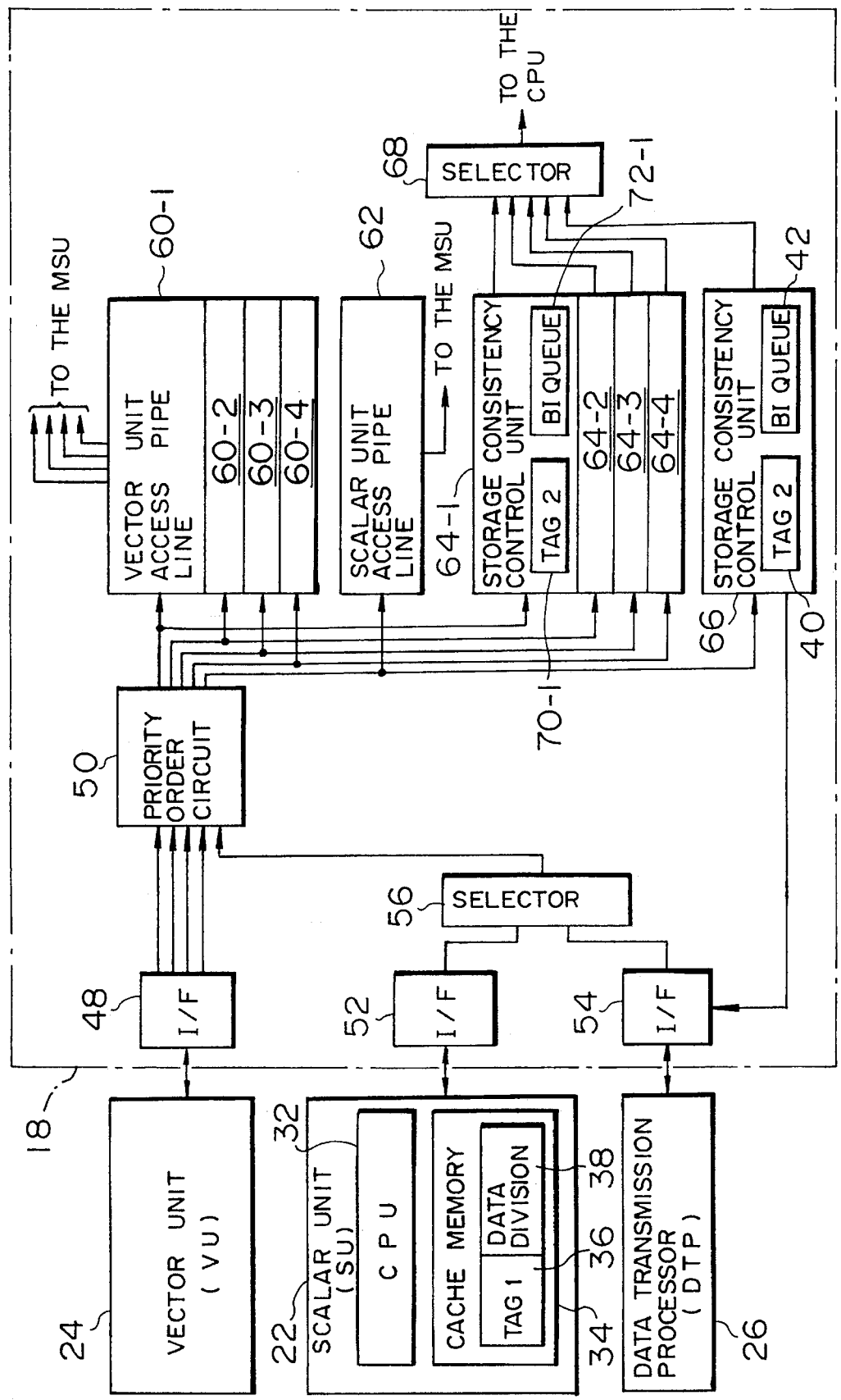
FIG. 6 is a block diagram showing an embodiment of a main control unit installed in a processor element.

FIG. 6 shows the details of a main control unit 18 installed in a processor element of the present invention. The main control unit 18 has vector unit access pipe lines 60-1, 60-2, 60-3, and 60-4 leading to the vector unit 24. In this embodiment, the vector unit 24 executes four operations of pipe line processing for a mask pipe line, a multiplication pipe line, an addition/logical computation pipe line, and a division pipe line. The four vector unit access pipe lines 60-1 to 60-n are therefore associated with the four operations of pipe line processing. Storage consistency control units 64-1 to 64-4 are included in association with the vector unit access pipe lines 60-1 to 60-4. Each of the storage consistency control units 64-1 to 64-4, for example, the storage consistency control unit 64-1 shown in FIG. 6, includes a second tag field 70-1 and a buffer invalidation queue 72-1.

A scalar unit access pipe line 62 and a storage consistency control unit 66 are included to cope with store access which the scalar unit 22 and data transmission processor 26 are requested of by other processor elements coupled via the data communication network 12. The storage consistency control unit 66 has a second tag field 40 in association with the first tag field 36 in the cache memory 34 in the scalar unit 22. The storage consistency control unit 66 further includes a buffer invalidation queue 42 so that when a store access address or an address at which store access is requested agrees with an address in the second tag field 40, the address is enqueued as a buffer invalidation address.

Each of the vector unit access pipe lines 60-1 to 60-4, scalar unit access pipe line 62, and storage consistency control units 64-1 to 64-4, and 66 receives a store access request via a priority order circuit 50. The priority order circuit 50 is coupled with the four access paths extending from the vector unit 24 via an interface 48. The priority order circuit 50 inputs a store access request from the scalar unit 22 via an interface 52 which is selected by a selector 56, or from any other processor element through the data transmission processor 26 via an interface 52. Any of buffer invalidation addresses provided by the storage consistency control unit 66 in the scalar unit and by the storage consistency control units 64-1 to 64-4 in the vector unit are selected by a selector 68, and fed to the CPU 32 in the scalar unit 22. Based on the selected addresses, buffer invalidation is performed on the cache memory 30; that is, addresses in the first tag field 36 are invalidated.

Figure 7:
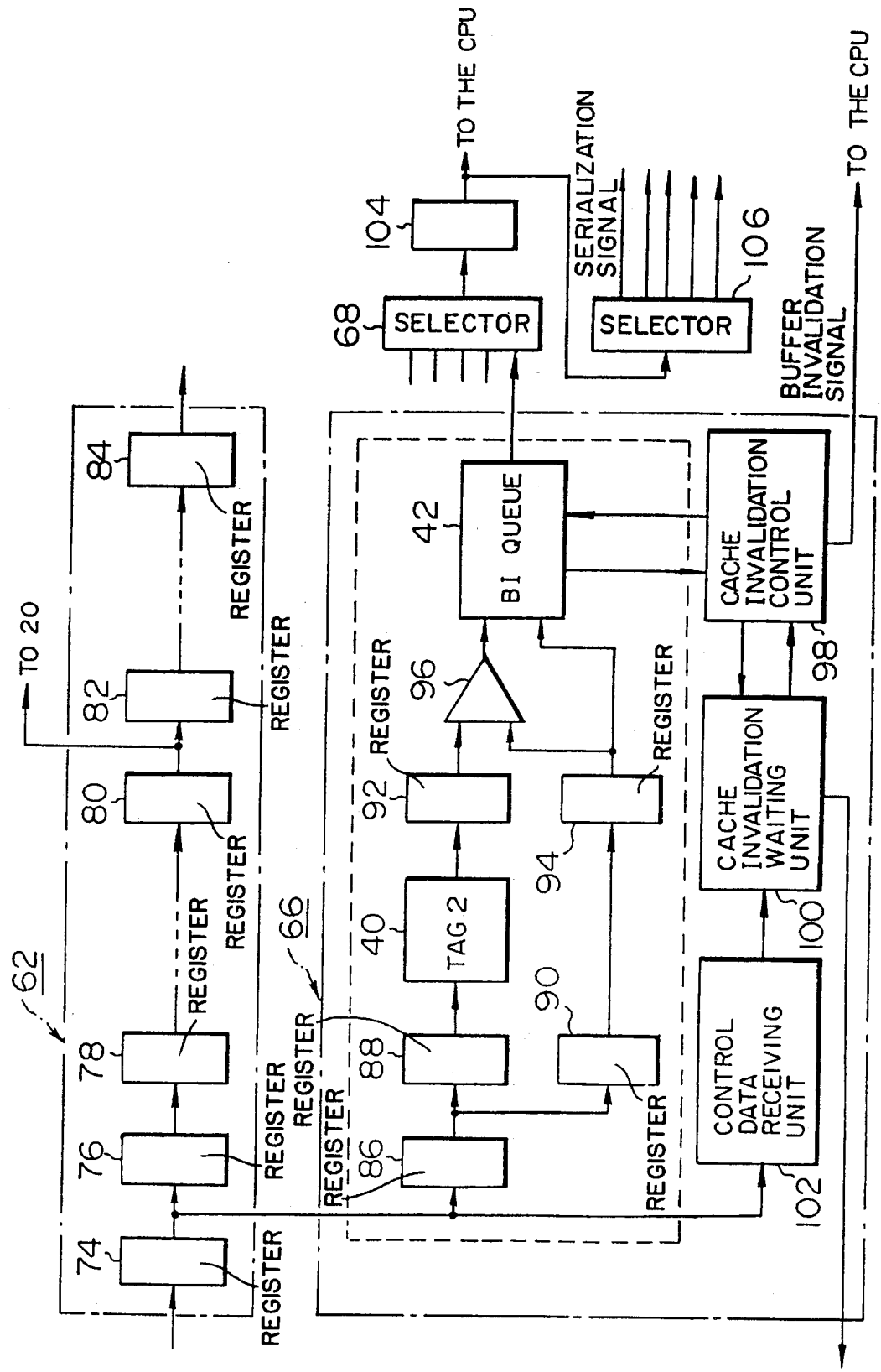
FIG. 7 is a block diagram showing the details of the scalar unit in FIG. 6.

FIG. 7 shows the details of the scalar unit access pipe line 62 and storage consistency control unit 66 shown in FIG. 6. The scalar unit access pipe line 62 comprises multiple registers of a register 74 to a register 84 in the last stage, wherein the multiple registers are coupled with one another by multistage connection. From the register 74 in the first stage to the register 84 in the last stage, for example, access data is transmitted at a 15 clock cycle. During the transfer from the register 80 to the register 82 located in the middle of the pipe line, store access or load access is executed for the main storage 20. In the storage consistency control unit 66, the output of a register 86 is branched into registers 88 and 90. The second tag field 40 is installed in a stage succeeding the register 88. In the second tag field 40, address data are stored as block addresses for blocks each consisting of, for example, 256 bytes by store access. Addresses are fetched from the second tag field 40 into a register 92 in synchronization with the transfer of data for store access to a register 94. A comparator 96 determines whether or not the data agree with the addresses. If the addresses for store access agree with the addresses existent in the second tag field 40, the comparator 96 instructs the buffer invalidation queue 42 to carry out storage control. The storage addresses in the register 94 are enqueued as buffer invalidation addresses in the buffer invalidation queue 42.

The state of comparison for determining a buffer invalidation address to be enqueued in the buffer invalidation queue 42 is supervised by a cache invalidation control unit 98. When a specified number of addresses, the number of addresses which have not filled the buffer invalidation queue 42, have been stacked in the buffer invalidation queue, the cache invalidation control unit 98 outputs a buffer invalidation signal to the CPU 32. At the same time, the cache invalidation control unit 98 activates a cache invalidation waiting unit 100. The cache invalidation waiting unit 100 outputs an inhibiting signal to the interfaces 52 and 54 in FIG. 6, thus stopping the data reception from the scalar unit 22 or any other processor element for the main storage 18.

As mentioned above, the cache invalidation control unit 98 stops reception of storage data, and then fetches buffer invalidation addresses sequentially from the buffer invalidation queue 42. The cache invalidation control unit 98 then transfers the addresses to the selector 68 and to the CPU 32 via a register 104. Consequently, buffer invalidation is performed on the cache memory 34; that is, addresses in the first tag field 36 are invalidated. Buffer invalidation addresses existent in the register 104 are interpreted by a decoder 106. The decoder 106 generates serialization signals to other main control units.

In this embodiment, only one main control unit is installed for the main storage 20. Serialization, which is required when multiple main control units access a single main storage, therefore need not be done. However, there is a possibility that a single main storage 20 may be shared by multiple main control units 18 installed in a single processor element. Hardware is therefore installed preliminarily to assist the decoder 106 in outputting serialization signals to other main control units.

Figure 8:
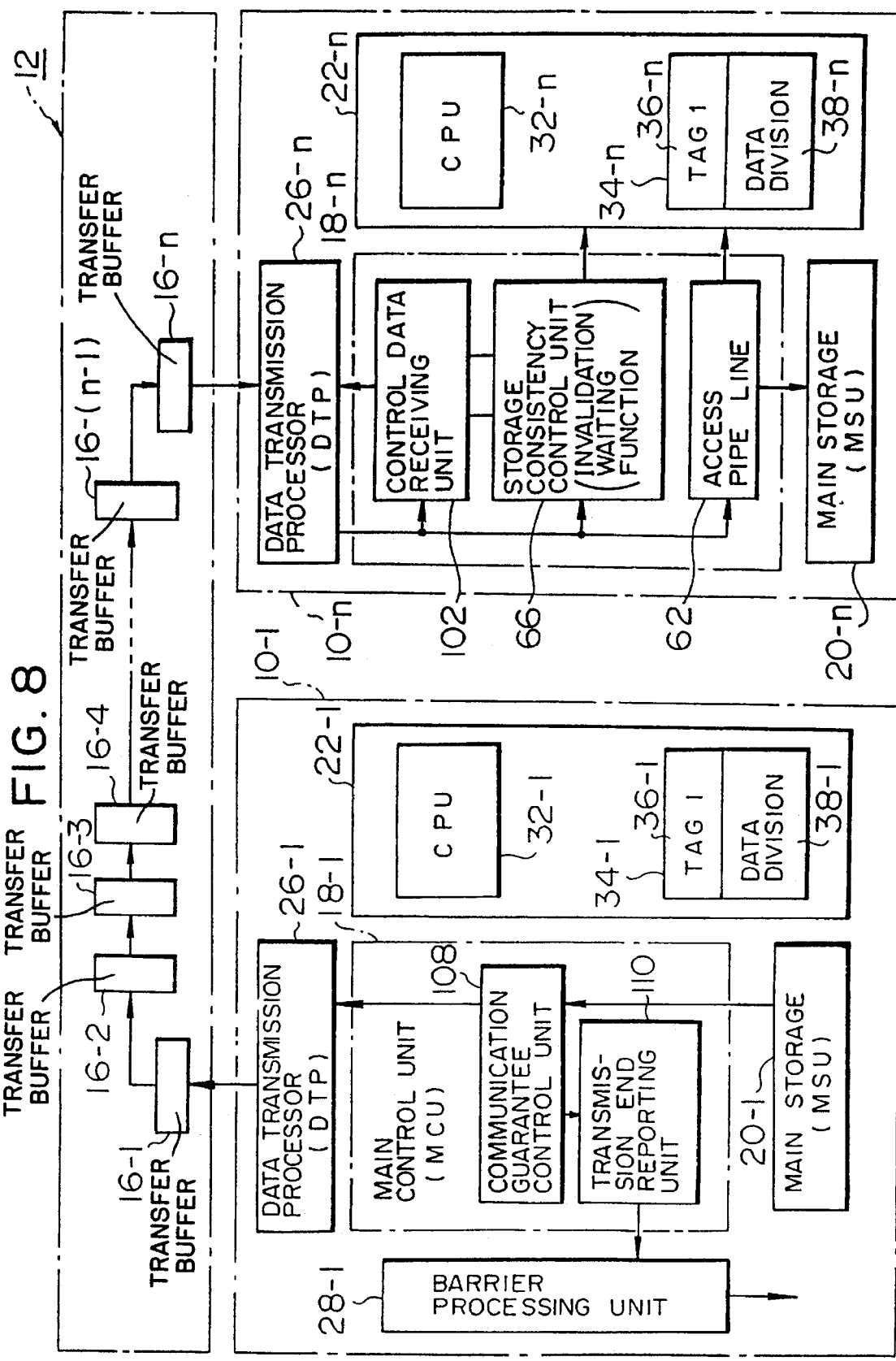
FIG. 8 is an explanatory diagram showing a state of communication between elements according to the present invention.

FIG. 8 is an explanatory diagram showing the processor elements 10-1 and 10-n to reveal the facilities required for a data communication network of the present invention, wherein data is transferred from the processor element 10-1 to the processor element 10-n. The facilities of a communication guarantee control unit 108 and a transmission end reporting unit 110 are validated for a main control unit 18-1 in the processor element 10-1 serving as a transmitting end. On the other hand, the facilities of a control data receiving unit 102, a storage consistency control unit 66, and an access pipe line 62 are validated for a main control unit 18-n in the processor element 10-n serving as a receiving end. The data communication network 12 carries out data transfer within a communication buffer length defined by the transfer buffers 16-1 to 16-n.

Figure 9:
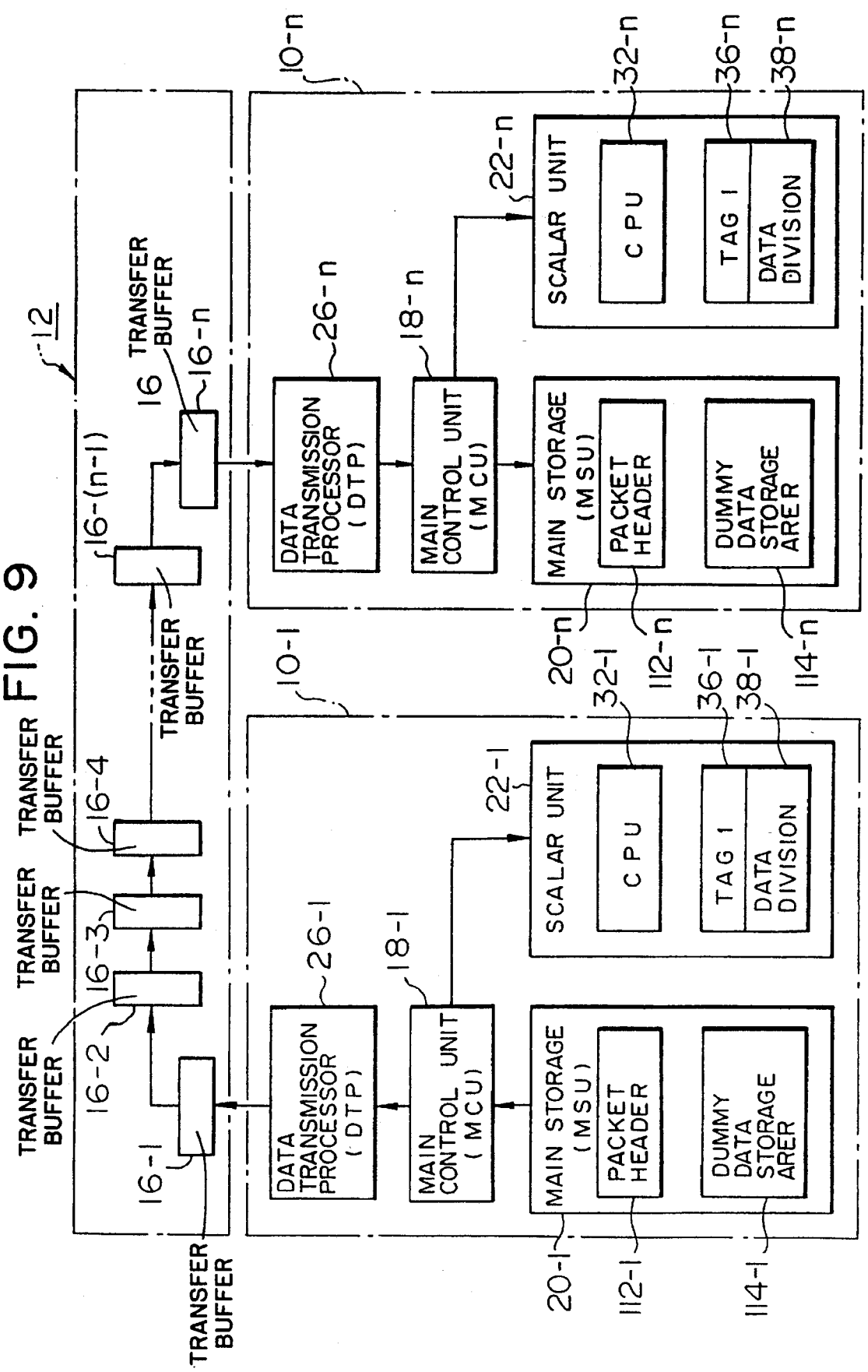
FIG. 9 is an explanatory diagram showing a state in which dummy data used for the communication in FIG. 8 is stored in a main storage.

FIG. 9 shows the main control units 20-1 and 20-n in the processor elements 10-1 and 10-n in the state of data communication. During data communication according to the present invention, the processor element 10-1 serving as a transmitting end creates a packet made up of a header and a body, and then transfers storage data to the processor element 10-n serving as a receiving station. According to the present invention, the transfer of storage data is succeeded by the transfer of a packet of dummy data for use in guaranteeing the operation of a receiving end with the processing done by a transmitting end alone. A packet of dummy data is, similarly to a packet of normal data, composed of a header and a body. The data length in the body is provided as a sum of the communication buffer length in the data communication network 12 and the transfer data length corresponding to the processing time required until the control data receiving unit 102 in the processor element 10-n serving as a receiving station interprets the header of the packet of dummy data and the buffer invalidation waiting unit stops data reception. The body of a packet of dummy data, which is used to guarantee the operations of the processor element 10-n serving as a receiving station that end with the termination of buffer invalidation for all storage data, is stored beforehand in each of dummy data storages areas 114-1 and 114-n in the main storages 20-1 and 20-n. Data embedded in the body of dummy data and stored in the dummy data storage areas 114-1 and 114-n is so-called garbage that is meaningless to any processing in the respective processor elements. However, the data length of garbage is significant in guaranteeing a period of time required for completing the operations of a receiving station ending with buffer invalidation. When the communication buffer length in the data communication network 12 varies with a processor element serving as a receiving end, the data length of so-called garbage stored in each of the dummy data storage areas 114-1 and 114-n must be changed. Specifically, data having a different data length and including an address pointer for indicating the location of a receiving station is stored in the dummy data storage areas 114-1 and 114-n.

Figure 10:
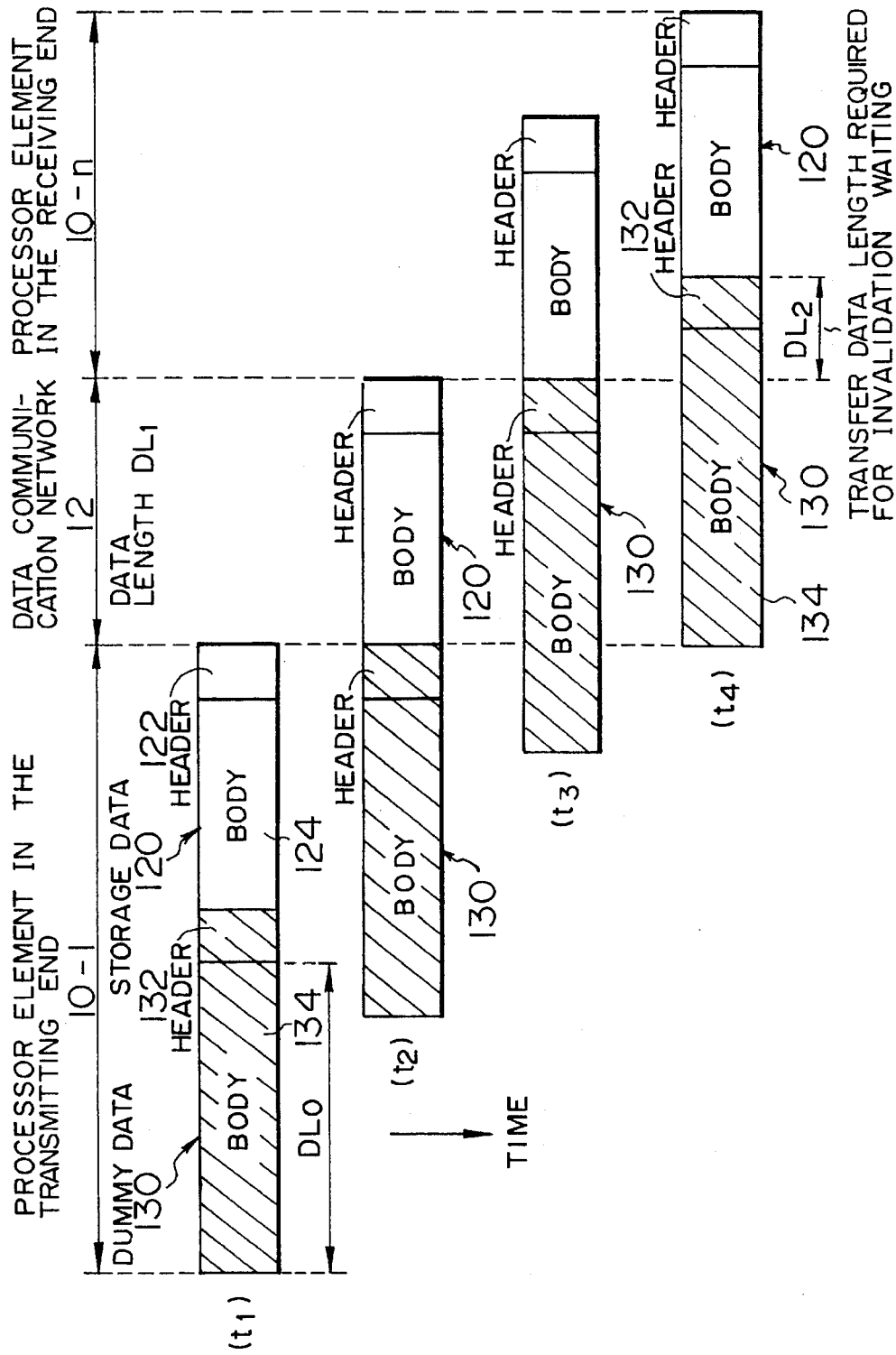
FIG. 10 is a timing chart showing data communication between the elements in FIG. 8.

FIG. 10 is a timing chart showing the temporal transition of data communication from the processor element 10-1 to processor element 10-n shown in FIGS. 8 and 9. At the time instant $t_1$, storage data 120 which has been processed by the processor element 10-1 serving as a transmitting end is available in the form of a packet having a header 122 and and a body 124. At the same time, dummy data 130 is also available in the form of a packet having a header 132 and a body 134 and succeeding the storage data 120. The header 132 of the dummy data 130 contains the control data for buffer invalidation waiting to be sent to the storage consistency control unit in the main control unit 18-n in the processor element 10-n serving as a receiving end. The data length $DL_0$ in the body 134 of the dummy data 130 is provided as a sum of the data length $DL_1$ in the data communication network 12 and the transfer data length $DL_2$ corresponding to the time required until the processor element 10-n serving as a receiving end receives and interprets the header 132 of the dummy data 130 and the buffer invalidation waiting unit stops data reception; that is, $$DL_0 = DL_1 + DL_2$$

At the time instant $t_2$ in FIG. 10, data transfer of the preceding storage data 120 starts, and the header 122 reaches the entry of the processor element 10-n serving as a receiving end. In this explanation, the transmission of the body 124 of the preceding storage data 120 to the data communication network 12 terminates at the same time. At the time instant $t_2$ in FIG. 10, when the transmission of the preceding storage data 120 to the data communication network 12 terminates, the dummy data 130 is transmitted immediately with the communication path of the data communication network 12 occupied.

At the time instant $t_3$, the leading end of the dummy data 130 transmitted immediately after the storage data 120 reaches the processor element 10-n serving as a receiving end. In this state, the header of the preceding storage data 120 has been interpreted, addresses for store access for a main storage and for buffer invalidation have been produced, and consistent addresses have been stacked in the buffer invalidation queue.

At the time instant $t_4$, transmission of the dummy data 130 to the data communication network 12 terminates. In the processor element 10-n serving as a receiving end, the control data for buffer invalidation waiting contained in the header 132 of the dummy data 130 is interpreted by, for example, the control data receiving unit 102 in the storage consistency control unit 66 in FIG. 7. A control signal is output to the cache invalidation waiting unit 100 according to the interpreted control data for buffer invalidation waiting. In response to the cache invalidation control signal sent from the control data receiving unit 102, the cache invalidation waiting unit 100 outputs an inhibiting signal to, for example, each of the interfaces 52 and 54 shown in FIG. 6, and stops the data reception from the scalar unit 22 and data transmission processor 26. In the slate attained at the time instant $t_4$ in FIG. 10, data transfer of the dummy data 130 to the processor element 10-n stops. In synchronization with stop control of data reception, the cache invalidation waiting unit 100 shown in FIG. 7 instructs the cache invalidation control unit 98 to activate invalidation. The cache invalidation control unit 98 is not bound to the conditions for activation, which depend on the number of addresses normally enqueued in the buffer invalidation queue 42, but outputs a buffer invalidation signal to the CPU 32 in order to request cache invalidation control. At the same time, the cache invalidation control unit 98 reads buffer invalidation addresses sequentially from the cache invalidation queue 42, supplies the read addresses to the CPU 32, and then executes the invalidation of the cache memory 32; that is, invalidates addresses in the first tag field 36. When completing the dequeuing of all the cache invalidation addresses from the buffer invalidation queue 42, the cache invalidation control unit 98 reports termination of processing to the cache invalidation waiting unit 100. In response to the report, the cache invalidation waiting unit 100 releases the inhibiting signals sent to the interfaces 52 and 54 shown in FIG. 6. Consequently, transfer of dummy data from the processor element 10-1 serving as a transmitting end via the data transmission processor 26, which has been in the stopped state, is restarted.

At the time instant $t_4$ in FIG. 10, termination of transmission of the dummy data 130 from the processor element 10-1 serving as a transmitting end to the data communication network 12 is detected by the transmission control unit 108 in the main control unit 18-1 in the processor element 10-1 serving as a transmitting end in FIG. 8. The transmission end reporting unit 110 reports the termination of transmission of dummy data to the barrier processing unit 28-1. In response to the termination end report, the barrier processing unit 28-1 outputs a synchronization request signal to the barrier network 14 so that control will be passed to the parallel processing at the next step.

Data communication from the processor element 10-1 to processor element 10-n shown in FIG. 10 is also performed between other processor elements. When termination of transmission of dummy data is detected, each processor element outputs a synchronization request signal to the barrier network 14. With the input of synchronization request signals sent from all processor elements 10-1 to 10-n, the barrier network 14 recognizes that parallel processing, which has been distributed to the processor elements, has terminated and that the conditions for transition to the next parallel processing stored in the main storages forming the global memory have been established. The barrier network 14 then executes synchronous control in order to allocate the next parallel processing to the processor elements.

After data reception stops at the time instant $t_4$, when the data reception restarts with the completion of buffer invalidation, the received dummy data 130, that is, the body 134 of the dummy data 130, is stored as garbage in the dummy data storage area 114-n in the main storage 20-n in the processor element 10-n serving as a receiving end as shown in FIG. 9.

FIG. 11 is a timing chart showing the operations of communication to be done when a data communication system of the present invention is further simplified. In the aforesaid embodiments, a data communication system of the present invention applies to data transfer within a parallel-processing machine. The present invention is not limited to this data transfer. When data transfer is performed between two data processing units via transfer buffers with a data length fixed but the transfer time unfixed, reception of transfer data by a receiving end can be guaranteed with the processing done by a transmitting end alone.

In FIG. 11, storage data 120 is transmitted from a transmitting processor element to a receiving processor element via the data communication network 12. At the time instant $t_1$, the dummy data 130 whose data length equals to the data length $DL_1$ in the data communication network 12 is made available. First, at the time instant $t_2$, the storage data 120 is transmitted. When the transmission of the storage data 120 terminates, the dummy data 130 is transmitted immediately. In the state attained at the time instant $t_3$ at which the transfer of the dummy data 130 terminates, since the data length $DL_0$ in the dummy data 130 is equal to the data length $DL_1$ in the data communication network 12, when a transmitting end detects the termination of the transmission of the dummy data 130, it is guaranteed that the preceding storage data 120 have reached the receiving processor element without fail. In the data communication system according to the present invention, all that is required is to transmit the dummy data 130, in which the data length $DL_0$ is longer than the data length $DL_1$ in the data communication network 12, immediately after the preceding transfer data.

As described so far, according to the present invention, the arrival of transferred data at a receiving end and the carrying out of specified operations on received data can be guaranteed with the detection of termination of transmission of dummy data by a transmitting end. From the beginning of data transfer, only a limited period of time is needed to learn the completion of data transfer to a receiving end and activate the processing required with the termination of data transfer. What is required for providing the above guarantee is that a transmitting end transmits dummy data. Only a limited number of hardware devices are therefore required to be installed additionally. Furthermore, control data that represents the operations to be performed by a receiving end can be appended to the prefix of dummy data. This results in a novel function that not only completion of data communication but also subsequent operations concerning received data, such as buffer invalidation control for attaining the consistency between the contents of a main storage and a buffer memory, can be guaranteed with the termination of transmission of dummy data by a transmitting end.

The control data embedded in the prefix or header of dummy data is not limited to buffer invalidation control data described in the aforesaid embodiments but may be any control data that is helpful in guaranteeing the operations required to be performed by a processing element serving as a receiving end with the reception of preceding storage data.

In the aforesaid embodiments, data transfer is performed in order to access a global area. The present invention further applies to all the other kinds of data transfer between processor elements. Moreover, the present invention can be modified in various manners and will therefore not be restricted to the numerical values indicated in the embodiments.

What is claimed is:

1. A data communication system having a transmission station which serially transmits processed data in a first given order to a receiving station, said data communication system guaranteeing, to the transmission station, an arrival of the processed data at the receiving station, said data communication system comprising:

data communication network means for connecting a communication path between the transmission and receiving stations through at least one communication buffer; and communication guarantee means, provided in said transmission station, for serially transmitting dummy data, having a length at least as long as a data length of all of said communication buffers existing in the established communication path formed by said data communication network means, in a second given order through all of said communication buffers existing in the established communication path to the receiving station subsequently to the processed data that is serially transmitted from the transmission station through all of said communication buffers existing in the established communication path, wherein the processed data, which has been transmitted prior to the dummy data, is forced in a run from said data communication network means at a time point when the transmission of the dummy data to said data communication network means is completed, thereby guaranteeing, to the transmission station, the arrival of the processed data at the receiving station.

2. A data communication system according to claim 1, wherein the dummy data transmitted by said communication guarantee means is a packet comprising a header and a body, wherein the length of the packet is at least as long as the data length of all of said communication buffers existing in the established communication path and the packet is serially transmitted through all of said communication buffers existing in the established communication path.

3. A data communication system according to claim 1, wherein the dummy data transmitted by said communication guarantee means is a packet comprising a header and body, and a data length of said body is at least as long as the data length of all of said communication buffers existing in the established communication path, wherein the processed data and the dummy data header are serially forced in a run from said data communication network means by the dummy data through all of said communication buffers existing in the established communication path at a time point when the transmission of the dummy data into said data communication network means is completed, thereby guaranteeing, to the transmission station, the arrival of the dummy data at the receiving station.

4. A data communication system according to claim 3, wherein said communication guarantee means transmits said dummy data with control data, wherein the control data designates operations to be performed on the processed data by a processing unit serving as the receiving station and is embedded in the dummy data header.

5. A data communication system according to claim 4, wherein said communication guarantee means sets the data length ($DL_0$) in said body of the dummy data to a data length provided as a sum of the data length ($DL_1$) of all of said communication buffers existing in the established communication path and a transfer data length ($DL_2$) corresponding to a time required until the dummy data header is interpreted by the receiving station and an execution of the operations designated by the control data is completed, and said communication guarantee means guarantees, to the transmission station, the arrival of the processed data and the dummy data header at the receiving station and an end of the execution of the operations designated by the dummy data header.

6. A data communication system according to claim 1, wherein the transmission station includes a transmission end reporting means for detecting the termination of the transmission of the dummy data to the receiving station and reports the termination to other processing units.

7. A data communication method in which a plurality of processing units, each of which has main storage means and an instruction processing unit and which executes processes in parallel, communicates with one another via data communication network means, said data communication network means connecting a communication path which uses at least one communication buffer and has a definite communication buffer length, said data communication method comprising:

a processed data transmitting step of serially transmitting processed data in a first given order from transmission means provided for a first one of said plurality of processing units through said data communication network means to a second one of said plurality of processing units designated as a receiving station; and a communication guaranteeing step, provided for said transmission means, of serially transmitting dummy data, having a data length at least as long as said definite communication buffer length, in a second given order from the transmission means through all of said communication buffers in the communication path subsequently to the transmission of the processed data from said transmission means, said communication guaranteeing step forcing in a run the processed data from said data communication network means by the dummy data at a time point when the transmission of the dummy data to said data communication network means is completed, thereby guaranteeing, for the transmission means, the arrival of the processed data at the receiving station.

8. A data communication method according to claim 7, wherein the dummy data to be transmitted at said communication guaranteeing step is a packet comprising a header and a body.

9. A data communication method according to claim 7, wherein the dummy data to be transmitted at said communication guaranteeing step is a packet comprising a header and a body, and is serially transmitted with a data length of said body at least as long as said definite communication buffer length, and the processed data and the dummy data header are forced in a run from said data communication network means by said dummy data at a time point when the transmission of the dummy data to said data communication network means is completed, thereby guaranteeing, to the transmission means, the arrival of the processed data and the dummy data header at the receiving station.

10. A data communication method according to claim 9, wherein at said communication guaranteeing step, the dummy data is transmitted with control data, wherein the control data designates operations to be performed on the processed data by said second one of said plurality of processing units serving as the receiving station, and the control data is embedded in the dummy data header.

11. A data communication method according to claim 10, wherein at said communication guaranteeing step, the data length ($DL_0$) of said body of the dummy data is set to a data length provided as a sum of said definite communication buffer length ($DL_1$) and a transfer data length ($DL_2$) corresponding to the time necessary until the control data of the dummy data header is interpreted and execution of the designated operations is completed, wherein the arrival of each of the processed data and the dummy data header at the processing unit designated as the receiving station and an end of the execution of the operations designated by the dummy data header is guaranteed to the transmission means.

12. A data communication method according to claim 7, wherein each of said processing units comprises:

a cache memory, provided for said instruction processing unit, for storing the same data as the processed data written to a predetermined address by an access of said main storage means;

storage consistency control means, that when the processed data is written in said main storage means, compares the access address with the registered address in said cache memory, wherein when the access address and the registered address coincide, said storage consistency control means transmits the same data in said cache memory to a queue as an invalidation address for invalidating the same data in said cache memory, sequentially takes out the same data from said queue, executes the cache invalidation and maintains the consistency between contents of said main storage means and said cache memory;

cache invalidation waiting means, that while said storage consistency control means is executing the cache invalidation, stops the data reception for a write access to said main storage means; and control data receiving means, that when interpreting the header of the received data as a cache invalidation wait instruction, operates said cache invalidation means to stop the data reception and allows said storage consistency control means to execute the cache invalidation;

wherein at said communication guaranteeing step, the dummy data is transmitted with control data, wherein the control data represents cache invalidation waiting to said processing unit designated as the receiving station, and is embedded in the dummy data header, and the data length ($DL_0$) of said body of the dummy data is provided as a sum of said definite communication buffer length $DL_1$ in said data communication network means and the transfer data length ($DL_2$) corresponding to processing time required until said processing unit designated as the receiving station interprets the control data in the dummy data header and stops the data reception for cache invalidation waiting;

wherein the arrival of each of the processed data and the header of the dummy data at said processing unit designated as the receiving station, the writing access into said main storage means of the processed data, and the termination of the cache invalidation is guaranteed to the transmission means.

13. A data communication method according to claim 7, further comprising a transmission end reporting step of detecting the termination of the transmission of the dummy data executed at said communication guaranteeing step and, in response, issuing a transmission end report to a barrier network means; and passing control by said barrier network means to the parallel processing when said barrier network means receives transmission end reports from all of said processing units that have executed parallel processing.

14. A data communication method according to claim 7, wherein said main storage means of said unit has a dummy data storage area, which stores meaningless data having a specified data length for use as the data length in the body of the dummy data, and at said communication guaranteeing step, data transfer is performed by designating said dummy data storage area as a write address.

15. A data communication method according to claim 7, wherein portions of said main storage means installed in said plurality of processing units are assigned as a global memory; and all of said processing units access the global memory comprising said main storage means to execute the parallel processing.

16. A data communication system for guaranteeing, to a transmitting side, an arrival of processed data to a receiving side, said data communication system comprising:

a plurality of processing units, each of which has main storage means and instruction processing means and executes parallel processing;

data communication network means that couples any two of said plurality of processing units via at least one communication buffer, thereby establishing a communication path;

a plurality of transmission means installed in respective ones of said plurality of processing units, each one of said plurality of transmission means for serially transmitting the processed data in a first given order to any other one of said plurality of processing units serving as a receiving station;

a plurality of receiving means installed in respective ones of said plurality of processing units, each of said plurality of receiving means for receiving the processed data from any other one of said plurality of processing units;

a plurality of communication guarantee means, each of which serially transmits dummy data, having a data length at least as long as a data length of all of said communication buffers existing in the established communication path formed by said data communication network means, in a second given order to the receiving station subsequently to the processed data, wherein each of said plurality of communication guaranteeing means transmits the dummy data to force in a run the processed data from said data communication network means by the dummy data, thereby guaranteeing, to the transmission means, the arrival of the processed data at the receiving station at a time point when the transmission of the dummy data into said data communication network means is completed.

17. A data communication system according to claim 16, wherein the dummy data to be transmitted by said each communication guarantee means is a packet comprising a header and a body.

18. A data communication system according to claim 16, wherein the dummy data to be transmitted by each of said communication guarantee means is a packet comprising a header and a body, said packet having a data length at least as long as the data length of all of said communication buffers existing in the established communication path in said data communication network means, wherein the processed data and the dummy data header are forced in a run from said data communication network means by the dummy data at a time point when the transmission of the dummy data into said data communication network means is completed, thereby guaranteeing, to the transmission means, the arrival of the processed data at said receiving means.

19. A data communication system according to claim 18, wherein said each communication guarantee means adds control data to the dummy data header to designate an operation which is executed by said processing unit serving as the receiving station with respect to the processed data, and transmits the resultant dummy data.

20. A data communication system according to claim 18, wherein said communication guarantee means sets the data length ($DL_0$) of the body of the dummy data to a data length provided as a sum of the communication buffer length ($DL_1$) of all of said communication buffers existing in the established communication path and a transfer data length ($DL_2$) corresponding to a time required until the receiving station decodes the dummy data header and the execution of the operation designated by the control data is completed, and the arrival of each of the processed data and the dummy data header at the receiving station, and a stopping operation of data reception designated in the control data of the dummy data header is guaranteed.

21. A data communication system according to claim 16, wherein each of said plurality of processing units comprises:

a cache memory provided for said instruction processing means and stores same data as the processed data written in the predetermined address by an access to said main storage means;

storage consistency control means, that when the processed data is written in said main storage means, compares the processed data with a registered address of said cache memory, wherein when the processed data agrees with the registered address, holds the address in a queue as an invalidation address for use in invalidating the same data in said cache memory, and extracts such addresses sequentially from said queue and then executes cache invalidation to maintain consistency between contents of said main storage means and said cache memory;

cache invalidation waiting means, that while said storage consistency control means is executing cache invalidation, stops the data reception for a writing access to said main storage means; and control data receiving means, that when interpreting the dummy data header as control data representing cache invalidation waiting, operates said cache invalidation;

wherein said communication guarantee means embeds the control data, which represents the cache invalidation waiting to the processing unit serving as the receiving station, in the dummy data header, and sets the data length ($DL_0$) in said body of the dummy data to a data length provided as a sum of the communication buffer length ($DL_1$) of all of said communication buffers existing in the established communication path in said data communication network means and a transfer data length ($DL_2$) corresponding to a processing time required until said processing unit serving as the receiving station interprets the control data in the dummy data header and stops the data reception for the cache invalidation waiting; and the arrival of each of the processed data and the dummy data header at said processing unit serving as the receiving station, and the termination of the writing access to said main storage means and the cache invalidation with respect to the processed data designated by the dummy data header are guaranteed.

22. A data communication system according to claim 16, further comprising barrier network means;

wherein said each processing unit includes a transmission end reporting means for detecting the termination of the transmission of the dummy data and issues a transmission end report to said barrier network means, and said barrier network means passes control to the parallel processing in response to receiving transmission end reports from all of said processing units which have executed parallel processing.

23. A data communication system according to claim 16, wherein said main storage means of said processing unit has a dummy data storage area, which stores meaningless data having a specified data length for use as the data length in the body of the dummy data, in said main storage means thereof; and said dummy data storage area is designated in a write address and the dummy data is transferred thereto.

24. A data communication system according to claim 16, wherein portions of each of said main storage means installed in respective ones of said plurality of processing units are assigned as a global memory;

and all of said processing units access the global memory to carry out the parallel processing.

25. A data communication system according to claim 24, wherein each of said plurality of processing units comprises:

a barrier network means;

a main storage;

a main control unit;

a scalar unit including a central processing unit for executing scalar computation and a cache memory;

a data transmission unit for transferring the processed data to and from said data communication network means;

a synchronous processing unit for executing synchronous control with said plurality of processing units based upon a sync signal transmitted via said barrier network means; and an input/output unit for inputting and outputting the processed data to and from external equipment, respectively.

26. A data communication system according to claim 25, wherein each of said plurality of processing units further comprises a vector unit for executing vector computation.

27. A data communication system according to claim 16, wherein said data communication network means is a crossbar network including buffer memories.

* * * * *